H. E. HUNTER.
Combined Galvanic and Medicated Pad.

No. 222,276.      Patented Dec. 2, 1879.

WITNESSES:
C. Neveux
C. Sedgwick

INVENTOR:
H. E. Hunter
BY Munn & Co
ATTORNEYS.

UNITED STATES PATENT OFFICE.

HENRY E. HUNTER, OF HINSDALE, NEW HAMPSHIRE.

IMPROVEMENT IN COMBINED GALVANIC AND MEDICATED PAD.

Specification forming part of Letters Patent No. 222,276, dated December 2, 1879; application filed September 25, 1879.

*To all whom it may concern:*

Be it known that I, HENRY E. HUNTER, of Hinsdale, in the county of Cheshire and State of New Hampshire, have invented a new and useful Improvement in Combined Galvanic Battery and Medicated Pad, of which the following is a specification.

Figure 1:
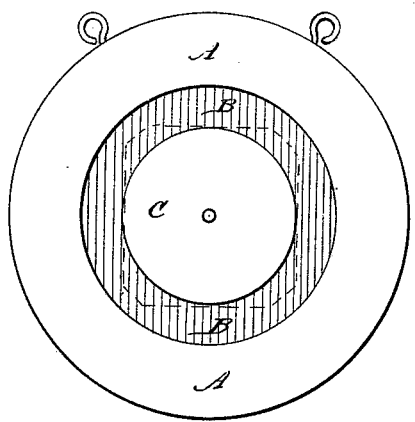
Figure 2:
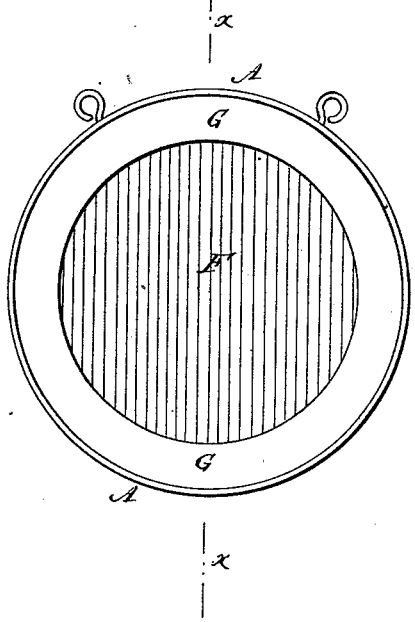
Figure 3:
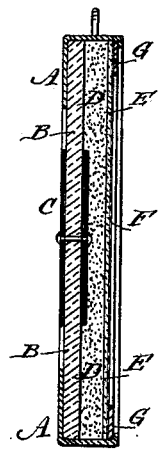

Figure 1 is a side elevation of my improvement. Fig. 2 is a rear elevation. Fig. 3 is a sectional elevation taken through the line $xx$, Fig. 2.

The object of this invention is to furnish a combined galvanic battery and medicated pad for the cure of bodily diseases.

The invention consists in the combination of a galvanic battery, formed of plates of zinc, felt, and copper, and a medicated pad, so that a circuit of galvanic electricity may be incited by moisture absorbed from the patient's body, while at the same time the patient receives benefit from the medicaments contained in the pad, as will be hereinafter fully described.

Similar letters of reference indicate corresponding parts.

A is a ring-plate of zinc, upon the rear side of which is placed a circular plate, B, of felt. To the center of the front side of the felt plate B is secured a circular plate, C, of copper. The copper plate C is made smaller than the cavity of the zinc plate A, so as to leave an open space between the zinc A and copper C, as shown in Figs. 1 and 3.

Another set of plates A C may be placed at the rear side of the felt B, if desired. Upon the rear side of the felt plate B is placed a layer, D, of suitable medicated absorbent material, which is covered with a plate, E, of felt or other suitable material, and a disk, F, of silk.

The pad D E F is secured in place by a narrow ring-plate, G, of zinc, and the whole is secured together by turning the outer edge of the zinc plate A down over the outer edge of the zinc plate G, as shown in Fig. 3, so that the patient may receive benefit from the medicaments contained in the pad D E F.

With this construction, when the device is in use, the moisture of the patient's body moistens the zinc plate A, the felt plate B, and the copper plate C, and excites a galvanic action, the current of electricity passing between the zinc A, copper C, moistened felt B, and the patient's body, thus making a circuit. The patient thus receives benefit from the current of electricity and from the medicaments contained in the pad.

Having thus fully described my invention, I claim as new and desire to secure by Letters Patent—

The ring zinc plate A, the felt plate B, and the ring copper plate C, the latter being smaller than the hole in plate A, in combination with the absorbent layer D, felt plate E, silk disk F, and ring-plate G, as and for the purpose specified.

HENRY E. HUNTER.

Witnesses:
W. D. FERRIN,
WARREN S. BARROWS.